(12) United States Patent
Mack et al.

(10) Patent No.: US 12,024,130 B2
(45) Date of Patent: Jul. 2, 2024

(54) MOVABLE PANEL FOR A VEHICLE EXTERIOR

(71) Applicant: Rivian IP Holdings, LLC, Plymouth, MI (US)

(72) Inventors: Luke Mack, Newport Beach, CA (US); Jonathan Salerno, Newport, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 16 days.

(21) Appl. No.: 17/494,140

(22) Filed: Oct. 5, 2021

(65) Prior Publication Data
US 2023/0103570 A1 Apr. 6, 2023

(51) Int. Cl.
*B60R 9/02* (2006.01)
*B60R 11/06* (2006.01)
*B62D 33/023* (2006.01)

(52) U.S. Cl.
CPC .............. *B60R 9/02* (2013.01); *B60R 11/06* (2013.01); *B62D 33/023* (2013.01)

(58) Field of Classification Search
CPC ......... B60R 9/02; B60R 11/06; B62D 33/023; B62D 33/027; B60J 5/101
See application file for complete search history.

(56) References Cited

U.S. PATENT DOCUMENTS

| | | | |
|---|---|---|---|
| 2,978,153 A * | 4/1961 | Brindle | B60R 9/02 296/183.1 |
| 3,068,038 A * | 12/1962 | Douglass, Jr. | B62D 33/08 296/183.1 |
| 3,245,713 A * | 4/1966 | Ogilvie | B60P 3/00 296/37.6 |
| 3,326,595 A * | 6/1967 | Ogilvie | B60R 9/02 224/404 |
| 4,135,761 A * | 1/1979 | Ward | B60R 9/02 29/434 |
| 5,615,922 A * | 4/1997 | Blanchard | B60R 9/02 224/404 |
| 6,003,923 A * | 12/1999 | Scott | B60R 11/06 296/37.6 |

(Continued)

OTHER PUBLICATIONS

Ram Box from 2009 Dodge Pickup Truck, 1 page (released Sep. 1, 2008).

(Continued)

*Primary Examiner* — Gregory A Blankenship
(74) *Attorney, Agent, or Firm* — Haley Guiliano LLP

(57) ABSTRACT

A vehicle may have a vehicle exterior panel, which includes a rigid body defining at least in part a vehicle outer surface. A utility panel having an exterior surface and a generally planar utility surface may be movable with respect to the rigid body between a first position and a second position. The exterior surface is integrated into the vehicle outer surface and the utility surface is concealed at least partially within the vehicle outer surface when the utility panel is in the first position. The utility surface is deployed outwardly from the vehicle outer surface and positioned substantially horizontally when the utility panel is moved to the second position, with the utility panel extending from a support point of the rigid body such that the utility surface provides a work surface extending from the vehicle.

20 Claims, 11 Drawing Sheets

(56) References Cited

U.S. PATENT DOCUMENTS

| | | | | |
|---|---|---|---|---|
| 6,030,018 | A * | 2/2000 | Clare | B60J 10/24 224/404 |
| 6,089,639 | A * | 7/2000 | Wojnowski | B60R 11/06 296/37.6 |
| 6,105,231 | A * | 8/2000 | Clare | B60R 11/06 29/469 |
| 6,237,211 | B1 * | 5/2001 | Clare | B60R 11/06 29/469 |
| 6,263,867 | B1 * | 7/2001 | Skelton | B60R 9/02 248/240.1 |
| 6,485,077 | B1 * | 11/2002 | Foster | B62D 33/02 296/183.1 |
| 7,334,184 | B1 * | 2/2008 | Simons | G06F 16/9535 715/234 |
| 9,027,984 | B2 * | 5/2015 | Bates | B60J 5/0476 296/186.4 |
| 9,499,203 | B1 * | 11/2016 | Finley | B62D 29/043 |
| 2005/0057073 | A1 * | 3/2005 | Hunt | B62D 33/0273 296/183.1 |
| 2005/0093339 | A1 * | 5/2005 | Klassen | B62D 33/03 296/183.1 |
| 2005/0134070 | A1 * | 6/2005 | Plentis | B60R 9/02 296/37.1 |
| 2005/0225117 | A1 * | 10/2005 | Miskech | B62D 33/0273 296/183.1 |
| 2006/0119134 | A1 * | 6/2006 | Dean | B62D 33/0273 296/182.1 |
| 2014/0021232 | A1 * | 1/2014 | Lazarevich | B60R 7/04 224/539 |
| 2018/0147918 | A1 * | 5/2018 | Salter | B60J 1/2072 |
| 2021/0155164 | A1 * | 5/2021 | Symonds | B62D 33/023 |
| 2023/0103570 | A1 * | 4/2023 | Mack | B62D 25/24 296/37.5 |

OTHER PUBLICATIONS

Rugby Contractor Dump Body, URL: https://web.archive.org/web/20181117143306/https://www.rugbymfg.com/products/medium-heavy-duty/contractor-dump-bodies, 5 pages (Nov. 17, 2018).

Truck Accessories, "Brute 60 inch Brute High Capacity Flat Bed TopSider with Drawers TB400-60-BD", 1 page, (disclosed Feb. 5, 2021).

Vehicle Photo 1, 1 page, disclosed on Feb. 5, 2021.
Vehicle Photo 2, 1 page, disclosed on Feb. 5, 2021.
Vehicle Photo 3, 1 page, disclosed on Feb. 5, 2021.
Vehicle Photo 4, 1 page, disclosed on Feb. 5, 2021.
Volkswagen Type II Flatbed, 1 page (introduced ~1967).

* cited by examiner

MOVABLE PANEL FOR A VEHICLE EXTERIOR

The present disclosure is directed to a movable panel structure for a vehicle exterior. More particularly, the present disclosure is directed to movable panel structure that provides a utility or work surface.

SUMMARY

Example approaches disclosed herein are generally directed to a vehicle exterior panel for a vehicle. In at least some example approaches, a vehicle exterior panel includes a rigid body defining at least in part a vehicle outer surface and a utility panel having an exterior surface and a generally planar utility surface. The utility panel may be movable with respect to the rigid body between a first position and a second position. The exterior surface is integrated into the vehicle outer surface and the utility surface is concealed at least partially within the vehicle outer surface when the utility panel is in the first position. The utility surface is deployed outwardly from the vehicle outer surface and positioned substantially horizontally when the utility panel is moved to the second position, with the utility panel extending from a support point of the rigid body such that the utility surface provides a work surface extending from the vehicle.

In at least some example illustrations, a vehicle includes a vehicle exterior panel having a rigid body defining at least in part a vehicle outer surface. The vehicle also includes a utility panel having an exterior surface and a generally planar utility surface. The utility panel is movable with respect to the rigid body between a first position and a second position. The exterior surface is integrated into the vehicle outer surface and the utility surface is concealed at least partially within the vehicle outer surface when the utility panel is in the first position. Further, the utility surface is deployed outwardly from the vehicle outer surface and positioned substantially horizontally when the utility panel is moved to the second position, with the utility panel extending from a support point of the rigid body such that the utility surface provides a work surface extending from the vehicle.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1A:
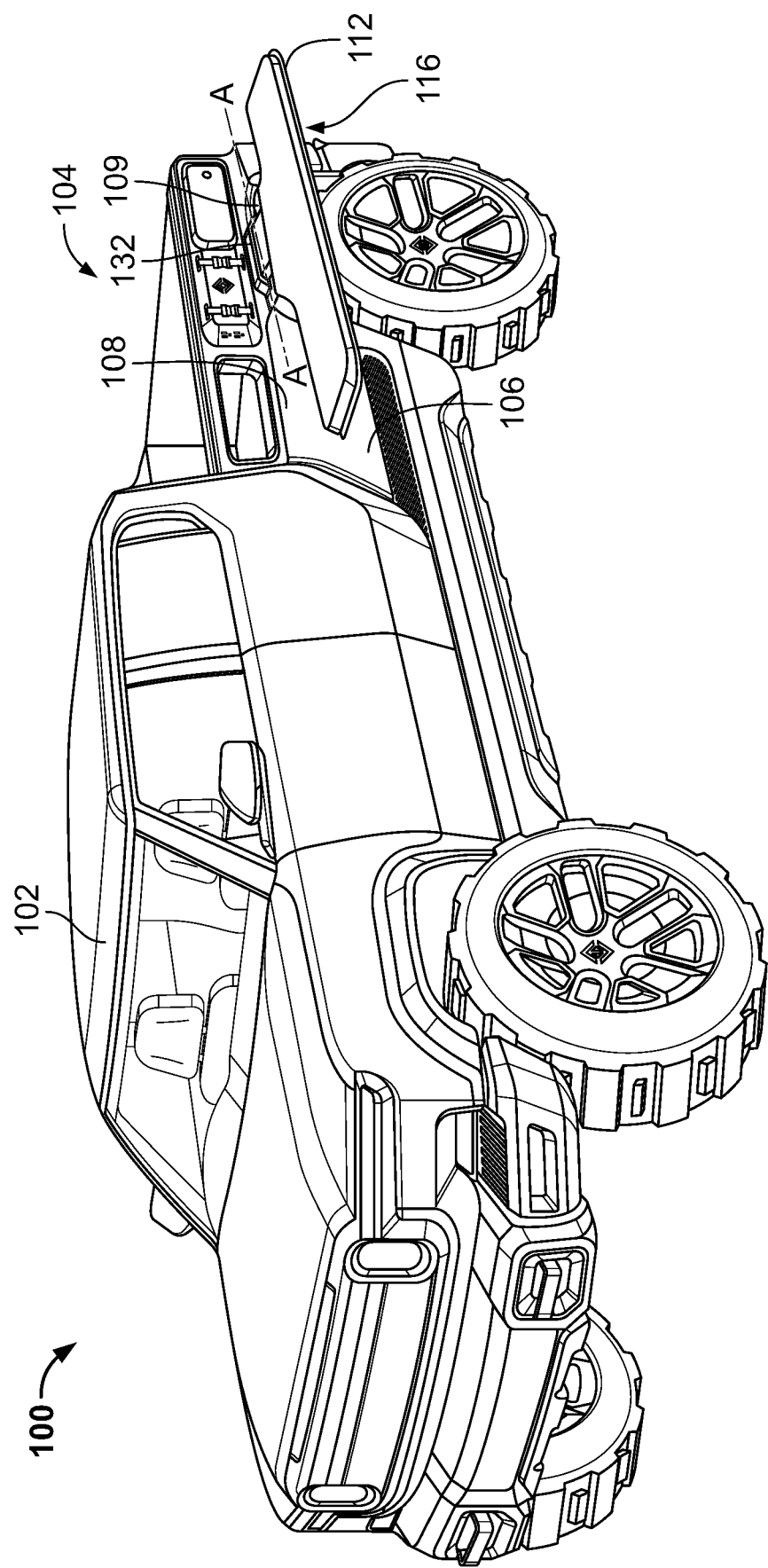
FIG. 1A shows a front perspective view of an example vehicle having a utility panel, in accordance with one example illustration.

The capability of off-road vehicles to reach remote destinations has increased, due in part to improved off-road traction, handling and/or improved range of such vehicles. As a result of this increased ability of off-road vehicles to reach remote destinations, there is a need for support systems that facilitate vehicle users staying in remote destinations.

Pickup truck vehicles typically have a liftgate that provides access to a rearward end of a cargo box. However, truck liftgates are generally low relative to a standing user, and as such would necessarily require the user to bend over the liftgate to use the liftgate as a work surface. Moreover, while truck beds generally provide ample space for hauling various items, preparation for using such items can result in a user setting or leaning such items against vehicle paint or other "show" surfaces of the vehicle, which risks damage to the vehicle.

Accordingly, example illustrations herein are directed to vehicles and exterior panels that provide one or more utility surfaces at a height that is convenient to a user for use as a work surface, i.e., to facilitate support of sufficient weight to allow the utility surface to be used as seating, a table, or for temporary storage of objects, or to lean objects against the utility surface, while not interrupting exterior design surfaces. Example utility surfaces may be defined by a utility panel that is movable with respect to a vehicle and/or vehicle exterior panel, e.g., by way of a pivoting mechanism such that the utility or work surface pivots with respect to a support point of a rigid body of the panel/vehicle. In other example approaches, a utility panel may be separable from a vehicle or vehicle panel, to allow the utility panel to be stowed within the vehicle or otherwise to conceal utility surface(s) defined by the utility panel. Example utility panels may thus provide utility as a table or work surface when needed, e.g., to support a user sitting on the surface, using as a table, etc., while not interrupting exterior design surfaces when stowed. In some example approaches a utility panel is integrated into a vehicle exterior when in a stowed position, with an exterior surface of the utility panel following a surface contour of adjacent panel(s) of the vehicle. The utility panel(s) may define a cut line about a perimeter of the utility panel, allowing the entire utility panel to be moved, pivoted, removed, etc. with respect to the vehicle and/or exterior panel of the vehicle.

Example illustrations herein area directed to utility panels and other features on a driver side of a vehicle, a passenger side of a vehicle, or both sides of a vehicle. It should be understood that the features disclosed herein may be identical on both sides of a vehicle or included in combinations of features provided on a single side of a vehicle, without limitation. Additionally, while certain utility panels or other features may only be shown on one side of a vehicle, e.g., on a driver-side or a passenger-side of a vehicle, identical features may be provided on opposite or other sides of the vehicle.

Turning now to FIGS. 1A-1D, an example vehicle 100 is illustrated. While the vehicle 100 is illustrated as a pickup truck having a passenger cabin 102 and a cargo bed 104, example illustrations herein may be employed in the context of any other type of vehicle that is convenient, e.g., a sport-utility vehicle (SUV), sedan, etc.

The vehicle 100 includes a rear quarter panel 106, which generally defines a vehicle outer surface 108 along a side of the vehicle 100 toward the rear of the vehicle. While the driver's side of the vehicle 100 is illustrated, the opposite/passenger side of the vehicle 100 may be arranged identically as the driver's side, e.g., as a "mirror" reflection of the driver's side.

The quarter panel 106 is generally installed to the vehicle 100 as a rigid body defining the vehicle outer surface 108. The vehicle outer surface 108 is generally vertical along the quarter panel 106 in the vicinity of a utility panel 112. In the example illustrated in FIGS. 1A-1D, the utility panel 112 is pivotally mounted to the quarter panel 106 at a lower end of the utility panel 112. Accordingly, the utility panel 112 is movable between at least two positions relative to the quarter panel 106. In a first position, the utility panel 112 is generally in a stowed position where the utility panel 112 is integrated into the vehicle outer surface 108, while in a second position the utility panel 112 is deployed to protrude from the vehicle outer surface 108. More specifically, the utility panel 112 may be lowered from the first/stowed position to the second/deployed position. The deployed position of the utility panel generally exposes or makes available a utility surface 114 that is defined by the utility panel 112. On the other hand, the utility panel 112 may be placed in the stowed position while the vehicle 100 is being driven or there is otherwise no need for the utility panel 112 to be deployed. In the stowed position, the utility surface 114 is at least partially concealed, and an exterior surface 116 of the utility panel 112 is generally integrated with the vehicle outer surface 108, as will be discussed further below.

As shown in FIG. 1A, the utility surface 114 extends generally horizontally in the deployed position, and thus may be used as a work surface or table. It should be noted that the horizontally extending utility surface 114, when deployed as shown in FIG. 1A, is positioned vertically at a height that facilitates use as a table or other work surface by a user (not shown). For example, the relatively higher position of the deployed utility surface 114 allows use by a user without requiring the user to bend or squat over the deployed utility surface 114. By comparison, a tailgate (not shown in FIGS. 1A-1D) of the cargo box 104 may deploy to a relatively lower vertical position than the utility surface 114, as may be necessary to facilitate loading/unloading of objects to the cargo bed 104. In some examples, the utility surface 114 is deployed outwardly from the vehicle outer surface 108 and substantially horizontally when the utility panel 112 is placed in the second/deployed position. Further, as seen in FIG. 1A, the utility panel 112 is supported at the vehicle outer surface 108 above a wheel arch 109 defined by the quarter panel 106, and may fold down or pivot from a pivot point 132 with respect to the quarter panel 106 about an axis A-A.

Figure 1B:
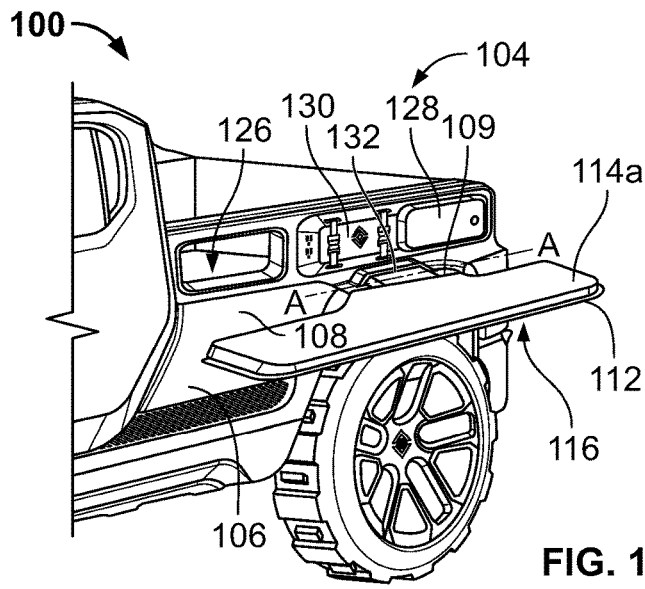
FIG. 1B shows an enlarged perspective view of a utility panel for the vehicle of FIG. 1A, in accordance with one example illustration.
Figure 1C:
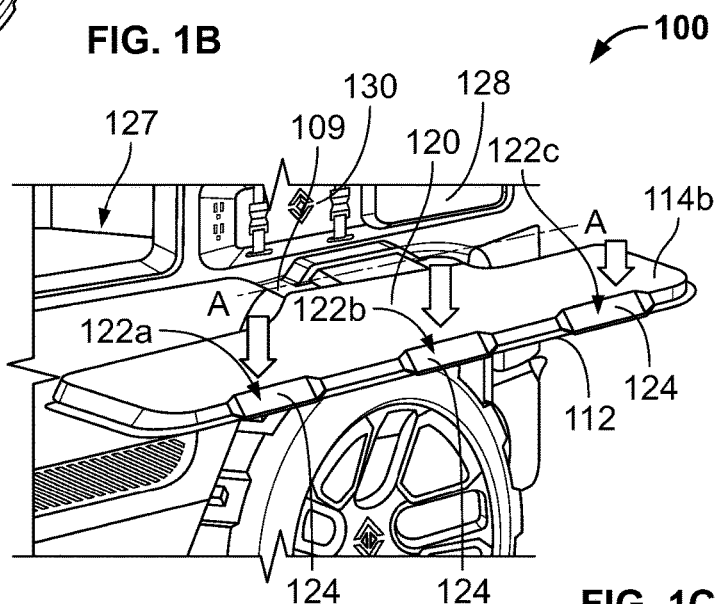
FIG. 1C shows an enlarged perspective view of another utility panel for the vehicle of FIG. 1A, in accordance with an example illustration.
Figure 1D:
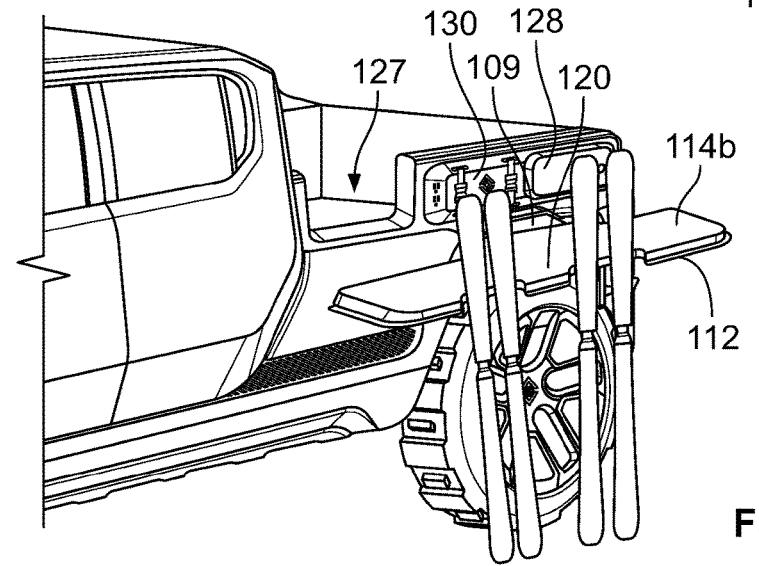
FIG. 1D shows another perspective view of the utility panel of FIG. 1C, in accordance with an example illustration.

Referring now to FIGS. 1B, 1C, and 1D, example utility surfaces 114a and 114b (collectively, 114) of the utility panel 112 in a deployed position are illustrated and described in further detail. In FIG. 1B, a first example utility surface 114a of the utility panel 112 is shown extending in a substantially continuous planar configuration. By contrast, in FIGS. 1C and 1D, the utility surface 114b includes a planar portion 120, as well as cavities 122a, 122b, and 122c (collectively, 122) of the utility panel 112. As shown in FIGS. 1C and 1D, the cavities 122 may be positioned along an uppermost edge of the utility panel 112. The cavities 122 each include an obliquely angled planar surface 124 that is configured to support leaning sports equipment, lumber, or any other objects tall enough to be leaned upon the deployed utility panel 112. In the example illustrated in FIG. 1D, pairs of skis are shown leaned against the utility panel 112 such that they are supported by the cavities 122. The cavities 122 generally retain an upper end of the skis therein, preventing the skis from tipping. Additionally, the cavities 122 may have a plastic or other surface that prevents damage to equipment positioned in contact with the cavities 122, such as the skis. Moreover, the cavities 122 also reduce or prevent damage to exterior surfaces of the vehicle 100, by reducing or eliminating the need to lean objects directly against the vehicle outer surface 108. Accordingly, cavities 122 generally allow for placement of an object against the vehicle 100, e.g., during unloading or loading of the vehicle 100.

The utility panel 112 may also facilitate storage within the quarter panel 106 or other functions. For example, as illustrated in FIG. 1B, deploying the utility panel 112 to the deployed/horizontal position may reveal an access port 126 to the cargo bed 104, which may allow access to the cargo bed 104 through the quarter panel 106. Additionally, a water storage container 128 may be provided in the quarter panel 106, and/or an accessory storage cavity 130, e.g., for a wireless speaker. The access port 126, water storage container 128, and accessory storage cavity 130 may each be concealed or covered up by the utility panel 112 when placed in the stowed position, as will be discussed further below. In the example illustrated in FIGS. 1C and 1D, an access notch 127 may be provided in an uppermost of the quarter panel 106, which may be revealed when the utility panel 112 is pivoted to the deployed position as shown. As best seen in FIG. 1D, the access notch 127 may allow an easier reach by a user into the cargo bed 104, e.g., by reducing the height over which a user may need to reach into the cargo bed 104, or may facilitate leaning of gear against the vehicle 100 in a similar manner as the cavities 122 of the utility panel 112. As with the example described above in FIG. 1B, the example utility panel 112 when deployed may reveal a water storage container 128 provided in the quarter panel 106, and/or an accessory storage cavity 130, e.g., for a wireless speaker.

Figure 2A:
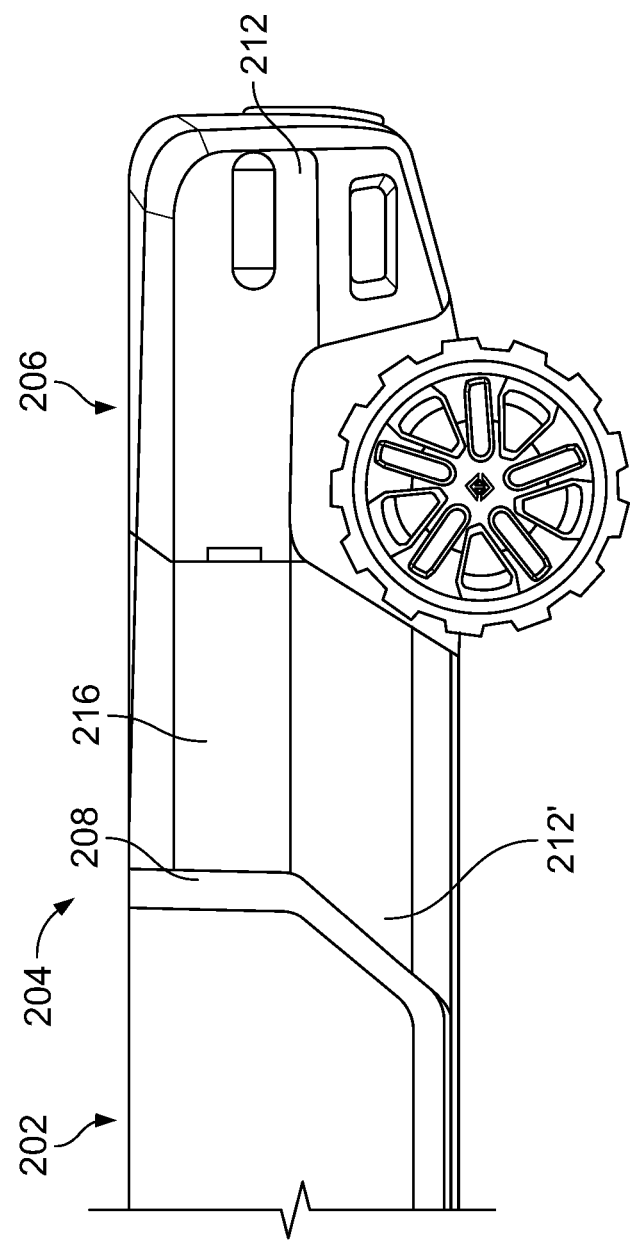
FIG. 2A shows a side view of an example vehicle having multiple utility panels in a first or stowed position, in accordance with another example illustration.
Figure 2B:
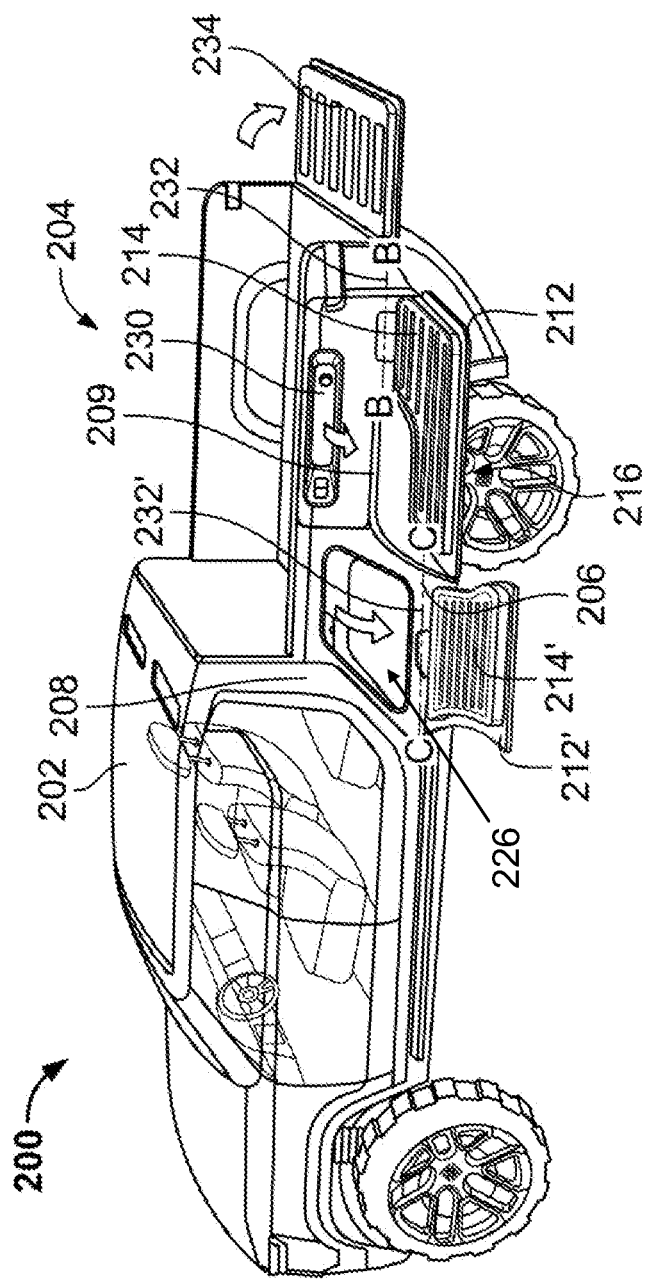
FIG. 2B shows a rear perspective view of the vehicle of FIG. 2A with the utility panels in a second or deployed position, in accordance with an example.

Turning now to FIGS. 2A and 2B, another example vehicle 200 is illustrated and described in further detail, which includes multiple utility panels that are movable at various positions about the vehicle. The vehicle 200 includes a passenger cabin 202 positioned in front of a cargo bed 204. The cargo bed 204 is defined in part by a quarter panel 206 along a rearward end of the vehicle 200. The quarter panel 206 is a generally rigid body defining a vehicle outer surface 208. The vehicle outer surface 208 is generally vertical along the quarter panel 206 in the vicinity of a utility panel 212, which is illustrated in a stowed or first position in FIG. 2A, and a deployed or second position in FIG. 2B. The example utility panel 212 illustrated in FIGS. 2A and 2B is pivotally mounted to the quarter panel 206 for movement between the first and second positions. For example, as best seen in FIG. 2B the utility panel 212 may be supported at the vehicle outer surface 208 above a wheel arch 209 defined by the quarter panel 206, and may fold down or pivot from a pivot point 232 with respect to the quarter panel 106 about an axis B-B. The utility panel 212 is generally integrated into the vehicle outer surface 208 when in the stowed position of FIG. 2A. By contrast, the utility panel 212 may be pivoted to the second/deployed position, in which it protrudes from the vehicle outer surface 208 as seen in FIG. 2B. The deployed position of the utility panel generally exposes a utility surface 214 that is defined by the utility panel 212. When the utility panel 212 is in the stowed position, the utility surface 214 is at least partially concealed, and an exterior surface 216 of the utility panel 112 is generally integrated with the vehicle outer surface 208.

As best seen in FIG. 2B, the utility surface 214 extends generally horizontally in the deployed position, and thus may be used as a work surface or table. As with the example utility surface 114 illustrated in FIGS. 1A-1D, the horizontally extending utility surface 214 is positioned vertically with respect to the vehicle 200 at a height that facilitates use as a table or other work surface by a user (not shown). For example, the relatively high position of the deployed utility surface 214 allows use by a user without requiring the user to bend or squat over the deployed utility surface 214. By comparison, a tailgate 234 of the cargo box 204, as seen in FIG. 2B, deploys to a relatively lower vertical position than the utility surface 214. In the example illustrated in FIG. 2B, the deployed utility surface 514 is positioned above a wheel arch 209 of the vehicle 200 and/or quarter panel 206.

The utility panel 212 may also facilitate storage within the quarter panel 206 or other functions. For example, as illustrated in FIG. 2B, deploying the utility panel 212 to the deployed/horizontal position may reveal an accessory storage cavity 230, which may be used to store water or other liquids in a container, accessories such as a wireless speaker, etc. The accessory storage cavity 230 may generally be concealed or covered up by the utility panel 212 when placed in the stowed position, as will be discussed further below. The utility surface 214 of the utility panel 212 is shown extending in a substantially continuous planar configuration, as may be useful as a table or work surface.

The vehicle 200 also includes a second utility panel 212' positioned adjacent the utility panel 212. The utility panel 212' similarly pivots from a first position illustrated in FIG. 2A to a second position illustrated in FIG. 2B. The utility panel 212' is supported at the vehicle outer surface 208, and may fold down or pivot from a pivot point 232' with respect to the quarter panel 206 about an axis C-C. In the first or stowed position, an exterior surface 216' of the utility panel 212' is integrated into the exterior surface 208 of the quarter panel, as with the exterior surface 216 of the utility panel 212. In the second position illustrated in FIG. 2B, a utility surface 214' of the utility panel 212' extends horizontally, similar to the utility surface 214 of the utility panel 212. However, the utility surface 214' is relatively lower vertically than the utility surface 214, facilitating use of the utility surface 214' as a chair or seat next to utility surface 214, which may be utilized as a table. Moreover, the utility panel 212' is configured to support the weight of a user for sitting upon the utility surface 214', e.g., as a result of additional support or members supporting the utility panel 212' in the deployed position. Alternatively or in addition, pivoting the utility panel 212' to the deployed/horizontal position may expose an access port 226, which opens into the cargo bed 204 or other storage compartment.

Figure 3A:
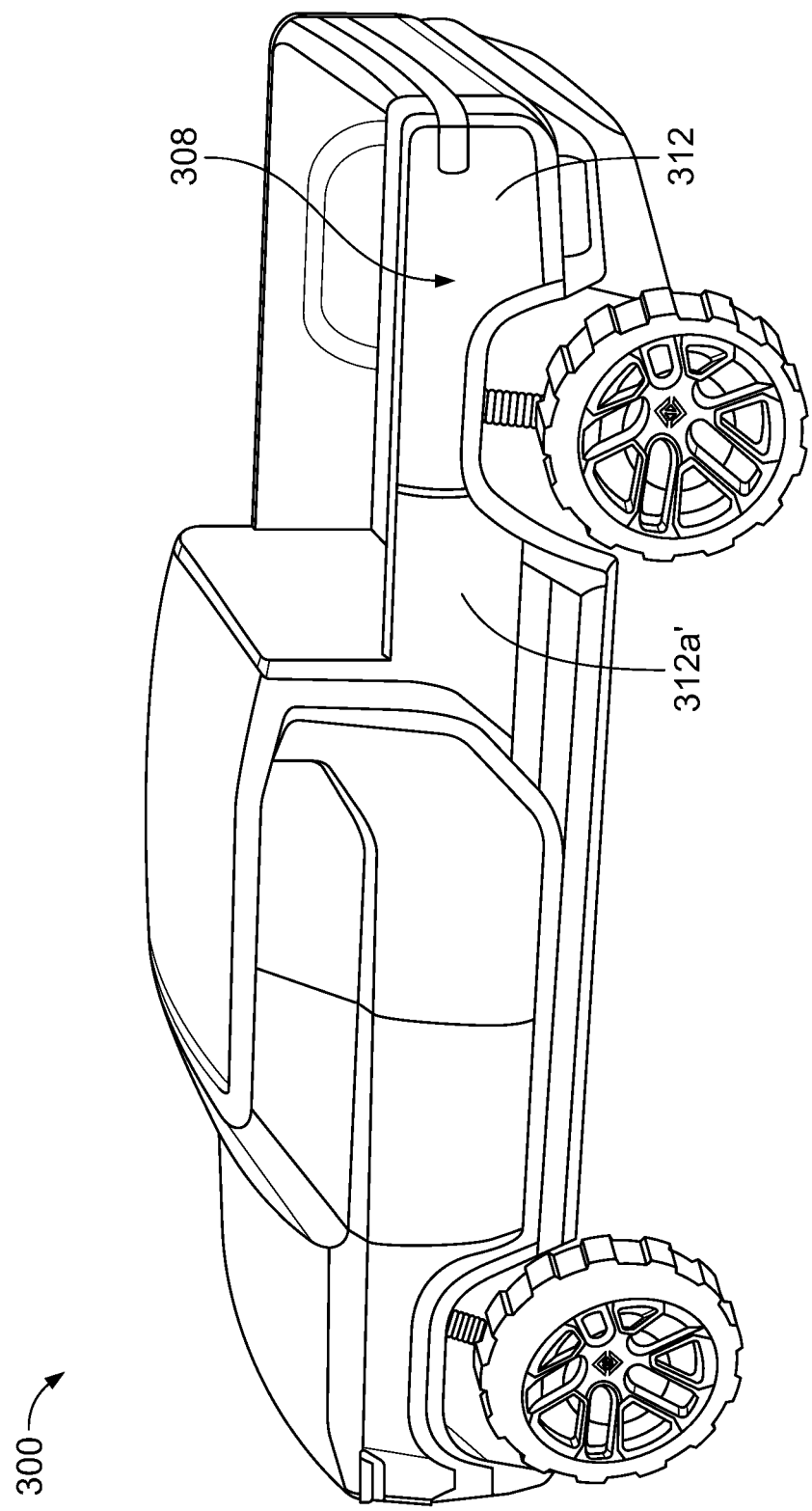
FIG. 3A shows a side perspective view of a vehicle having utility panel(s) in a stowed position, in accordance with one example illustration.
Figure 3B:
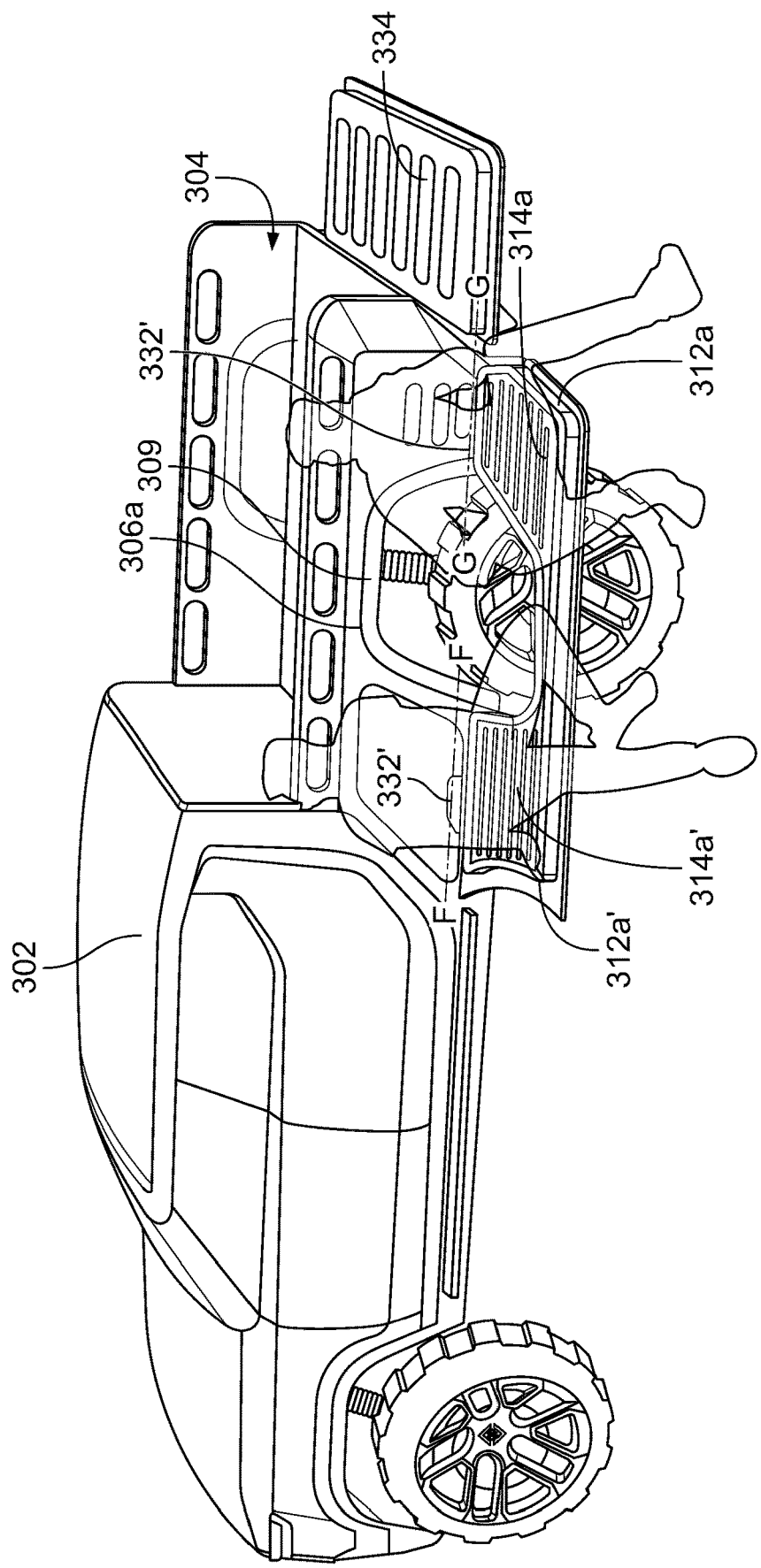
FIG. 3B shows a driver-side perspective view of the vehicle of FIG. 3A with one or more utility panels in a deployed position, in accordance with one example illustration.
Figure 3C:
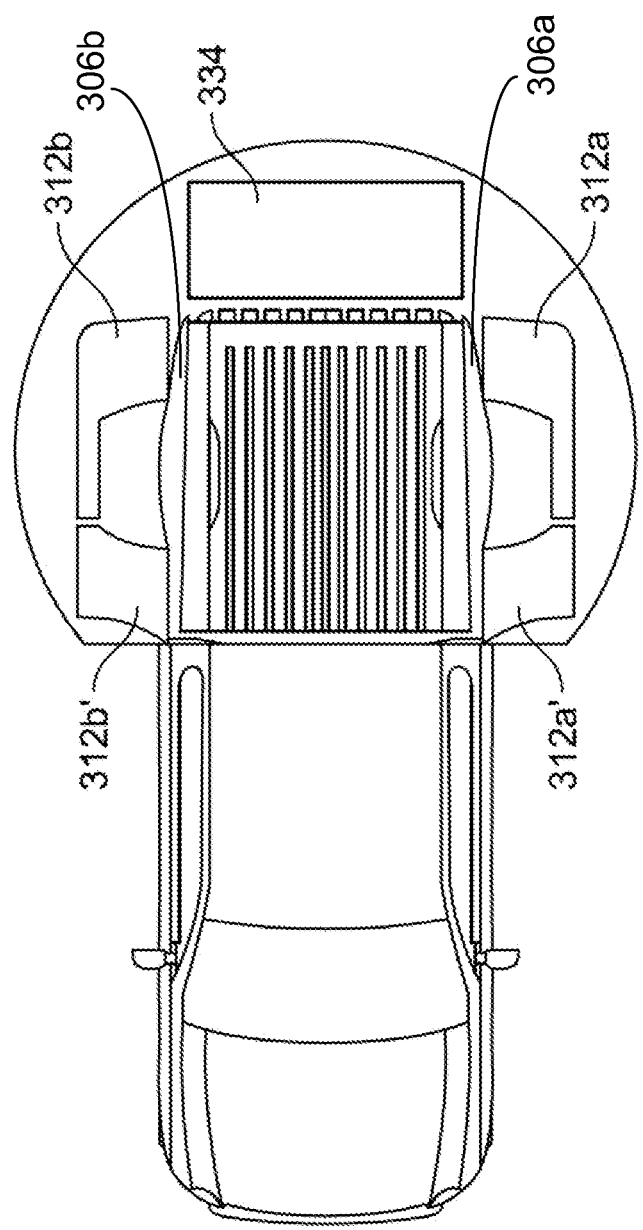
FIG. 3C shows a top view of the vehicle of FIGS. 3A-3B with one or more utility panels in a deployed position, in accordance with an example illustration.

Turning now to FIGS. 3A-3D, example vehicles 300 and 300' are shown having multiple utility panels positions about an exterior of the vehicle 300. More specifically, in the example illustrated in FIGS. 3A-3C, vehicle 300 is shown with seating provided about three sides (i.e., 270 degrees) of the vehicle 300, while in FIG. 3D another example vehicle 300' is shown having a seating and table arrangement. Vehicle 300 includes a passenger cabin 302 positioned in front of a cargo bed 304. Quarter panels 306a, 306b (collectively, 306) extend along driver and passenger sides, respectively, of a cargo bed 304 toward a rearward end of the vehicle 300. The quarter panels 306 are each a generally rigid body defining a vehicle outer surface 308. The vehicle outer surfaces 308 of each quarter panel 306 are generally vertical along the quarter panel 306. Each of the quarter panels 306a, 306b respectively includes a first utility panel 312a, 312b, which is illustrated in a stowed or first position in FIG. 3A, and a deployed or second position in FIGS. 3B and 3C. The example utility panels 312 illustrated in FIGS. 3A-3C are each pivotally mounted to their respective quarter panel 306 for movement between the first and second positions. As best seen in FIG. 3B, the utility panel 312a and 312a' each fold down or pivot from pivot points 332 and 332' about axes F-F and G-G, respectively. Similarly, the utility panels 312b and 312b' may fold down from respective pivots points and axes, e.g., as discussed further below. The utility panels 312 are each generally integrated into the vehicle outer surface 308 when in the stowed position of FIG. 3A. By contrast, the utility panels 312 may be pivoted to the second/deployed position, in which it protrudes from the vehicle outer surface 308 as seen in FIGS. 3B and 3C. The deployed position of the utility panels generally exposes respective utility surfaces 314a, 314b. When the utility panels 312 are in the stowed position, the respective utility surface 314 is at least partially concealed, and an exterior surface 316 of the utility panel 312 is generally integrated with the vehicle outer surface 308.

Figure 3D:
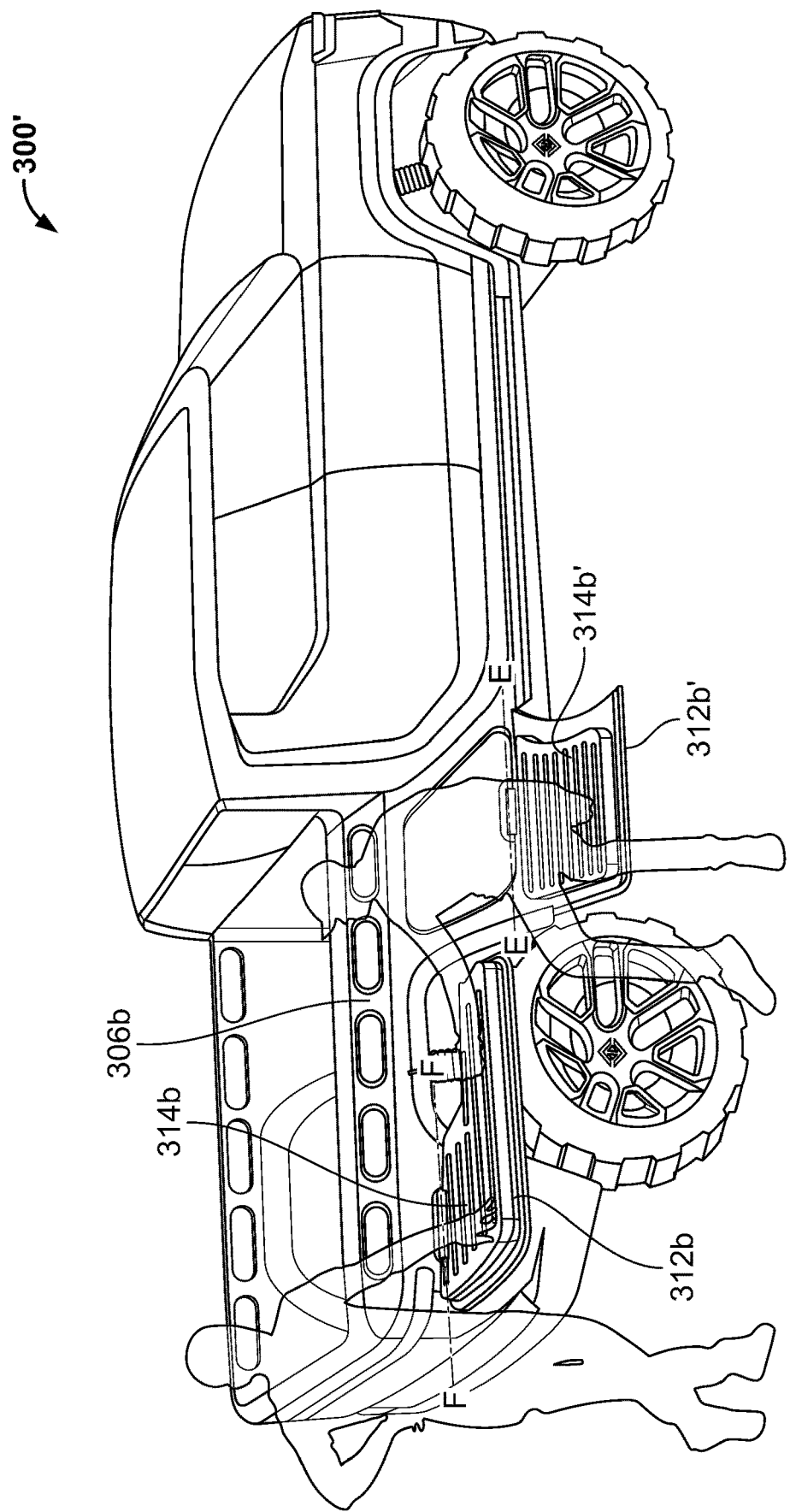
FIG. 3D shows a passenger-side perspective view of a vehicle with one or more utility panels in a deployed position, in accordance with an example illustration.

As best seen in FIGS. 3B-3D, the utility surfaces 314a, 314b of the vehicles 300, 300' each extend generally horizontally in the deployed position. The passenger-side utility surface 314b of the vehicle 300' in FIG. 3D is generally elevated with respect to a tailgate surface 334, with the deployed utility surface 314 being positioned above a wheel arch 309 of the vehicle 300 and/or quarter panel 306. The utility panel 312b folds down or pivots from a pivot point 332", about an axis D-D. The utility surface 314a and 314b each also extend along a greater length of the vehicle 300 longitudinally than with other example utility panels, e.g., extending longitudinally from a position behind the wheel arch 309 to a position above the wheel arch 309. Additionally, the utility surfaces 314a' and 314a may cooperate to form a generally continuous surface, e.g., which may be used as a bench as illustrated in FIG. 3A that extends the length of the cargo area 304. While the utility surfaces 314a, 314a' and respective utility panels 312a, 312a' are illustrated as being two separately pivoting components, in some examples the utility panels 312a, 312a' may be provided as a single monolithic piece configured to pivot with respect to the cargo area 304. The driver-side utility surface 314a is positioned relatively lower, e.g., at a vertical height with respect to the vehicle 300 that is approximately the same as the tailgate surface 334 as shown. The vehicle 300 also includes a pair of second utility panels 312*a*', 312*b*' (collectively, 312') that are positioned adjacent their respective utility panels 312*a*, 312*b*. Each of the utility panels 312' similarly pivot from a first position illustrated in FIG. 3A to a second position illustrated in FIGS. 3B-3D. In the first or stowed position, an exterior surface 316' of each utility panel 312' is integrated into the exterior surface 308. In the second position best seen in FIG. 3D, a utility surface 314*b*' of the utility panel 312*b*' extends horizontally, and is relatively lower vertically than the adjacent utility surface 314*b*, facilitating use of the utility surface 314*b*' as a chair or seat next to utility surface 314*b*, which may be utilized as a table. Additionally, the utility panel 312*b*' may be configured to support the weight of a user to facilitate use of the utility surface 314*b*' as a seat or chair adjacent the table. One or more of the utility panels 312 may also facilitate storage within its respective quarter panel 306, e.g., as similarly described above with reference to FIGS. 1 and 2, or other functions.

As noted above, in the example vehicle 300' illustrated in FIG. 3D, one utility panel 312*b* pivots about an axis D-D which is elevated with respect to a pivot axis E-E of another utility panel 312*b*'. Accordingly, when deployed as shown in FIG. 3D, the utility surface 314*b* serves as a table surface that is elevated with respect to the utility surface 314*b*' of the adjacent utility panel 312*b*'.

Figure 4:
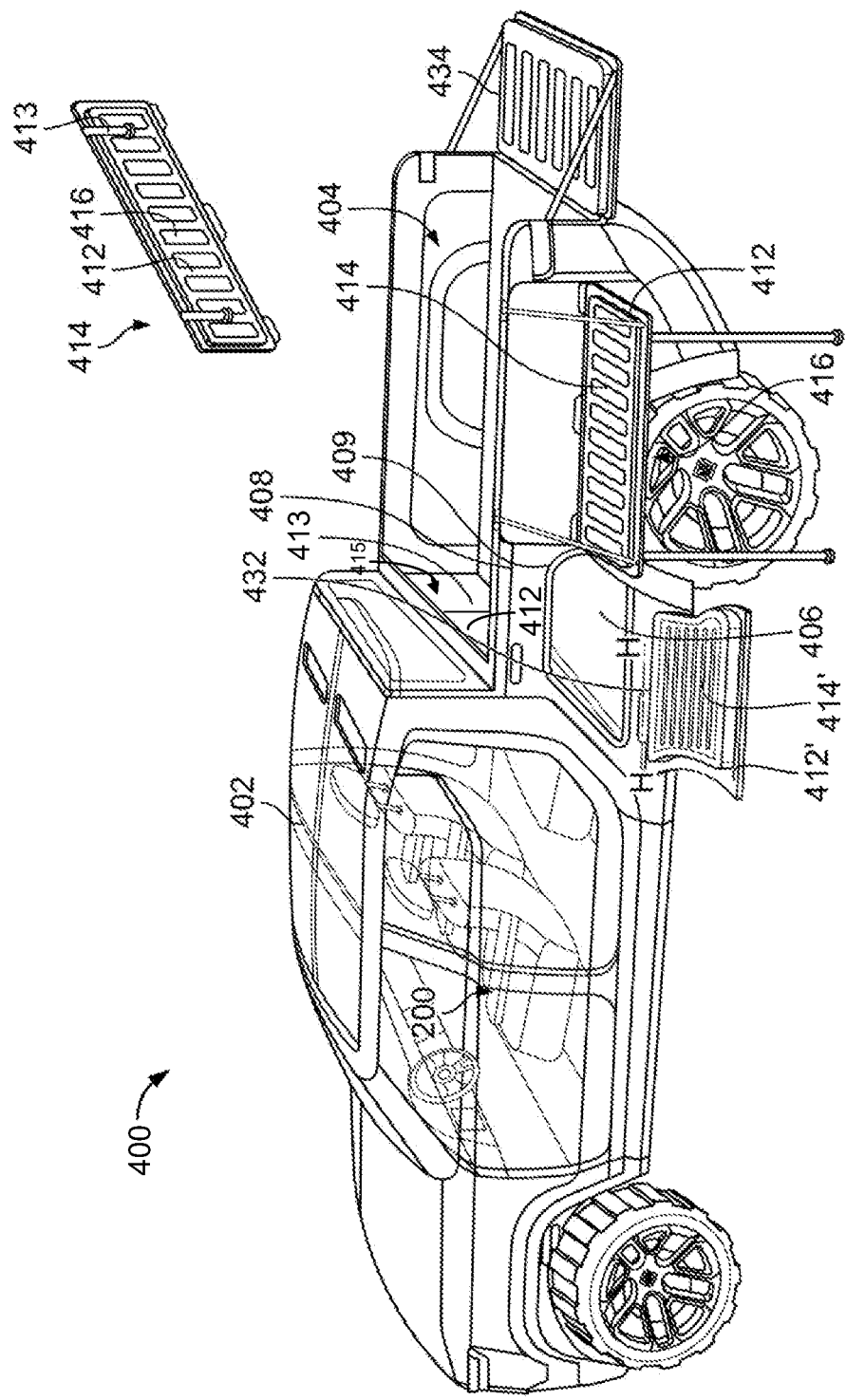
FIG. 4 shows a side perspective view of an example vehicle having utility panel(s) in a deployed position, in accordance with another example.

Turning now to FIG. 4, another example vehicle 400 is illustrated and described in further detail. As with the above described vehicles 100, 200 and 300, the vehicle 400 includes a passenger cabin 402 positioned in front of a cargo bed 404. The cargo bed 404 is defined in part by a quarter panel 406 along a rearward end of the vehicle 400. The quarter panel 406 is a generally rigid body defining a vehicle outer surface 408. The vehicle outer surface 408 is generally vertical along the quarter panel 406. A deployable utility panel 412 is provided, which is selectively mountable to the quarter panel 406. More specifically, in contrast to the pivotable arrangement of other utility panels described above, the utility panel 412 is separable from the vehicle 400. In a first position, the utility panel 412 may be mounted within the cargo bed 404 of the vehicle 400. More specifically, the utility panel 412 may form a forward surface 415 of the cargo bed 404, adjacent the passenger cabin 402. The utility panel 412 may positioned within the cargo bed 404 in any manner convenient. While the forward surface 415 is shown at a forward end of the cargo bed 404, in other examples the utility panel 412 may be positioned or stowed in different areas of the cargo area 404, e.g., by integrating or storing in the tailgate 434 at a rearward end of the cargo area 404, along a side of the cargo area 404, etc. Moreover, the utility panel 412 may in still other examples be positioned elsewhere within the cargo area 404, e.g., to divide the cargo area 404 into separate storage areas. The utility panel 412 may be removed from the stowed position and mounted in a horizontal position to the quarter panel 406. When mounted to the quarter panel 406, the utility panel 412 protrudes horizontally from the vehicle outer surface 408. The deployed position of the utility panel 412 generally provides a utility surface 414 that is defined by the utility panel 412. By contrast, when the utility panel 412 is mounted within the cargo bed 404, the utility surface 414 is at least partially concealed. Accordingly, the utility panel 412 does not disrupt exterior surface 408 of the vehicle 400. In some examples, a utility panel is divided into two separate pieces, e.g., into a first utility panel 412 and a second utility panel 413 as illustrated in FIG. 4. In the example illustrated, the second utility panel 413 may also be mounted within the cargo bed 404, cooperating with the utility panel 412 to form forward surface 415 of the cargo bed 404. The second utility panel 413 may be removable from the cargo bed 404 or otherwise separable from the vehicle 400, and may be mounted in a passenger side quarter panel of the vehicle 400 in substantially mirror-image fashion with respect to the utility panel 412 described above, i.e., along the passenger-side of the vehicle. While the utility panels 412 and 413 are shown as separate pieces, in some examples they may be a single monolithic piece that can be deployed from two or more support points to extend away from the vehicle surface 408.

The utility surface 414 of the utility panel 412 extends generally horizontally in the deployed position, as shown in FIG. 4, and thus may be used as a work surface or table. Similar to other examples described above, the horizontally extending utility surface 414 is positioned vertically with respect to the vehicle 400 at a height that facilitates use as a table or other work surface by a user (not shown). In the example illustrated in FIG. 4, the deployed utility surface 414 is positioned above a wheel arch 409 of the vehicle 400 and/or quarter panel 406. The relatively higher position of the deployed utility surface 414 allows use by a user generally without requiring the user to bend or squat over the deployed utility surface 414. By comparison, a tailgate 434 of the cargo box 404, deploys to a relatively lower vertical position than the utility surface 414.

The vehicle 400 also includes an additional utility panel 412' positioned adjacent the deployed utility panel 412. The utility panel 412' is supported at the vehicle outer surface 408, and may fold down or pivot from a pivot point 432 with respect to the quarter panel 406 about an axis H-H. The utility panel 412', in contrast to the removable utility panel 412, generally pivots between a stowed position (not shown in FIG. 4) and a deployed position. In the first or stowed position, an exterior surface (not shown in FIG. 4) of the utility panel 412' is integrated into the exterior surface 408 of the quarter panel, as with other example utility panels described herein. In the deployed position illustrated in FIG. 4, a utility surface 414' of the utility panel 412' extends horizontally, similar to the utility surface 414 of the utility panel 412. However, the utility surface 414' is relatively lower vertically than the deployed utility surface 414, facilitating use of the utility surface 414' as a chair or seat next to utility surface 414, which may be utilized as a table. Alternatively or in addition, pivoting the utility panel 412' to the deployed/horizontal position may expose an access port (not shown in FIG. 4) that allows access to the cargo bed 404 or other cargo cavity (not shown) through the quarter panel 406.

Figure 5A:
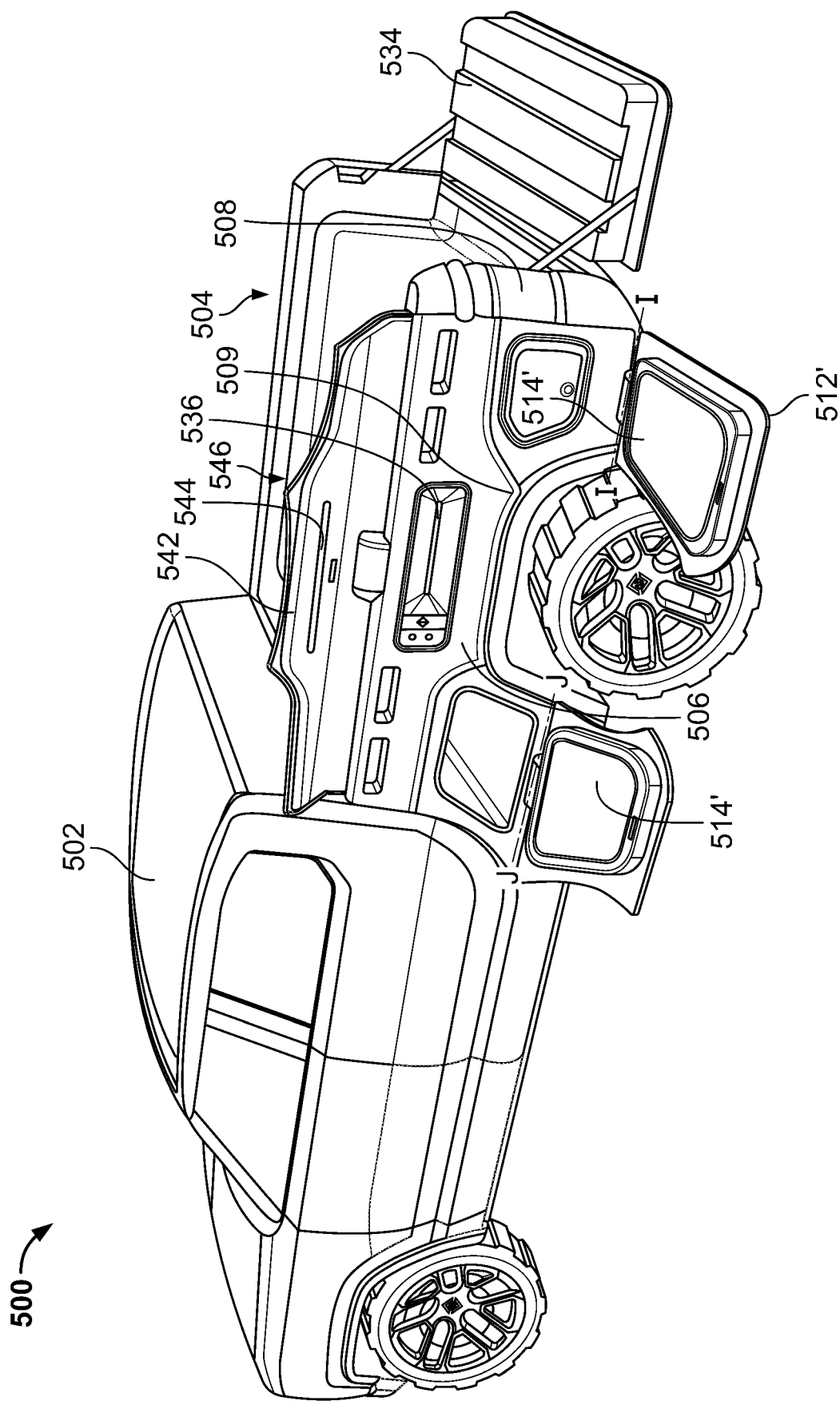
FIG. 5A shows a driver-side perspective view of an example vehicle having utility panels in a deployed position, in accordance with another example.
Figure 5B:
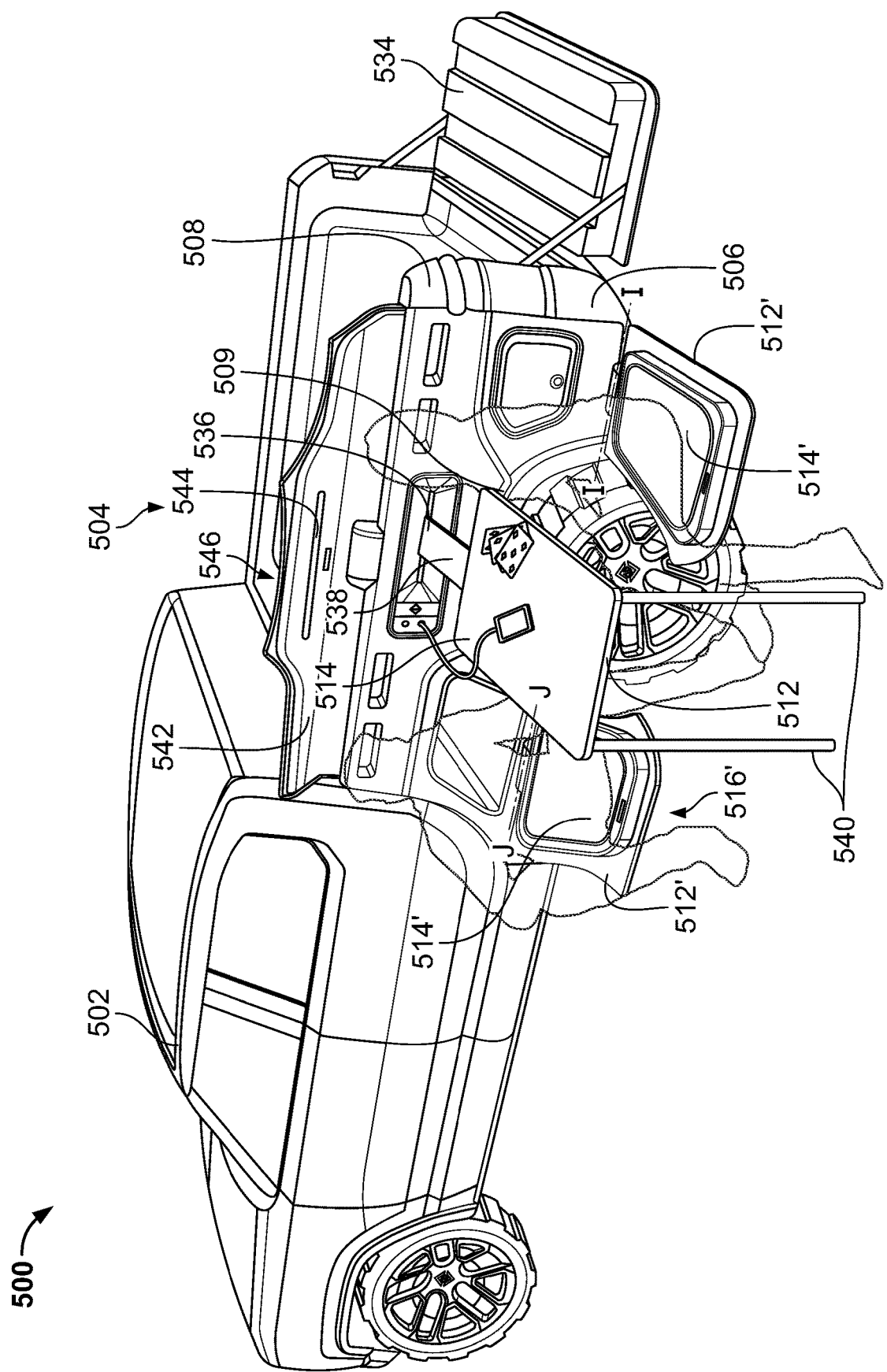
FIG. 5B shows a driver-side perspective view of the vehicle of FIG. 5A having utility panels in a deployed position, in accordance with another example.

Turning now to FIGS. 5A and 5B, another example vehicle 500 is illustrated and described in further detail. As with the above described vehicles 100, 200, 300, and 400, the vehicle 500 includes a passenger cabin 502 positioned in front of a cargo bed 504. The cargo bed 504 is defined in part by quarter panels 506 on either side of the cargo bed 504 along a rearward end of the vehicle 500. A tailgate 534 provides access to the cargo bed 504 from the rear of the vehicle 500.

The quarter panels 506 are each a generally rigid body defining a vehicle outer surface 508. The vehicle outer surface 508 is generally vertical along the quarter panel 506. One or more deployable utility panel(s) 512 may be provided, which are configured to be mounted to either quarter panel 506, for example as illustrated in FIG. 5B. When mounted to the quarter panel 506, the utility panel(s) 512 may extend from the vehicle 500 in a generally horizontal position. For example, as shown in FIG. 5B, a longitudinally extending slot or cavity 536 of the quarter panel 506 may receive a panel tab 538, allowing utility panel 512 to be supported along an edge of the utility panel 512. Legs 540 may also be provided to support an end of the utility panel 512 away from the vehicle 500, thereby adding additional support and increasing the ability of a utility surface 514 of the panel 512 to bear weight, e.g., as a table or work surface. The deployed position of the utility panel 512 generally positions the utility surface 514 for use as a table or work surface. As best seen in FIG. 5B, the utility surface 514 is elevated with respect to the deployed tailgate 534. The deployed utility surface 514 is also positioned above a wheel arch 509 of the vehicle 500 and/or quarter panel 506. Accordingly, the horizontally extending utility surface 514 is positioned vertically at a height above the ground that facilitates use as a table or other work surface by a user (not shown), e.g., such that a user need not bend or squat over the deployed utility surface 514.

The utility panel 512 shown in FIG. 5B is selectively removable from the vehicle 500, e.g., by disassembling the legs 540 and removal of the panel tab 538 from the slot 536. Upon removal, the utility panel(s) 512 may be stowed, e.g., within the cargo bed 504 of the vehicle 500. Accordingly, the utility surface 514 of each utility panel(s) 512 may be at least partially concealed within the vehicle 500 and does not disrupt exterior surface 508 of the vehicle 500.

The vehicle 500 also includes additional utility panels 512' positioned on either side of the utility panel 512. The utility panels 512', in contrast to the removable utility panel 512, may generally pivot between a stowed position (not shown in FIG. 5A or 5B) and a deployed position. Each of the utility panels 512' may fold down or pivot from pivot points 532 with respect to the quarter panel 506 about axes and J-J, respectively. In the first or stowed position, exterior surfaces (not shown in FIG. 5A or 5B) of the utility panels 512' are generally integrated into the exterior surface 508 of the quarter panel, as with other example utility panels described herein. In the deployed position illustrated in FIGS. 5A and 5B, a utility surface 514' of each of the utility panels 512' extends horizontally, similar to the utility surface 514 of the utility panel 512. The utility surfaces 514' are generally lower vertically than the utility surface 514 of the deployed utility panel 512, facilitating use of the utility surfaces 514' as a chair or seat next to utility surface 514, which may be utilized as a table. Alternatively or in addition, pivoting the utility panels 512' to their deployed/horizontal position may reveal a respective access port to the cargo bed 504, or a storage area within the quarter panel 506.

The vehicle 500 may also include a cover panel 542 that is configured to selectively conceal the slot 536, e.g., when the utility panel 512 is not in use or is stowed on the vehicle 500. In the illustrated example, the cover panel 542 may cooperate with the utility panel 512' when each are in the stowed position to conceal the slot 536, and generally provide a continuous exterior surface 508 of the vehicle 500, e.g., in similar fashion as illustrated in connection with the exterior surfaces 208, 308 of the vehicles 200, 300 shown in FIGS. 2A and 3A. The cover panel 542 is pivotally supported on the quarter panel 506, such that the cover panel 542 is selectively raised to expose the slot 536 to allow the utility panel 512 to be secured to the quarter panel 506. Lighting may also be provided in the area of the quarter panel 506 via the cover panel 542. More specifically, a light 544 may be positioned to cast light downward onto the utility panels 512' and/or utility panel 512, as illustrated in FIGS. 5A and 5B, respectively. Accordingly, the cover panel 542 is movable with respect to the quarter panel 506 between stowed/deployed positions such that, when deployed as shown in FIGS. 5A and 5B, an interior or interior surface of the cover panel 542 extends outwardly from the vehicle outer surface 508 and faces downwardly, such that the light 544 casts light in a downward direction, e.g., onto utility surface 514 and/or utility surfaces 514'. The cover panel 542 may have an exterior surface 546 that is integrated into the vehicle outer surface 508 when closed to conceal or cover the slot 536.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A vehicle exterior panel, comprising:
   a rigid body defining at least in part a vehicle outer surface;
   a utility panel having an exterior surface and a utility surface, wherein the utility panel comprises:
     a lower portion pivotably mounted above a wheel arch such that the utility panel is movable with respect to the rigid body between a first position and a second position; and
     an upper portion that extends longitudinally beyond the lower portion;
   wherein the utility panel conceals a storage cavity when the utility panel is in the first position;
   wherein the exterior surface of the utility panel is integrated into the vehicle outer surface; and
   wherein the utility surface is deployed outwardly from the vehicle outer surface and positioned substantially horizontally when the utility panel is moved to the second position.

2. The vehicle exterior panel of claim 1, wherein the vehicle exterior panel is a rear quarter panel of a vehicle.

3. The vehicle exterior panel of claim 1, wherein:
   the utility panel is a first utility panel
   the vehicle exterior panel comprises at least a second utility panel, the second utility panel movable with respect to the rigid body between first and second positions, the second utility panel defining a second utility surface that is deployed outwardly from the vehicle outer surface and substantially horizontally when the second utility panel is moved to the second position; and
   the second utility panel in the second position is at a vertical position below the first utility panel in the second position.

4. The vehicle exterior panel of claim 1, wherein:
   the upper and lower portions of the utility panel form a T-shape; and
   the T-shape extends outwardly from the vehicle outer surface when the utility panel is in the second position.

5. The vehicle exterior panel of claim 1, wherein the upper portion of the utility panel extends longitudinally from a front portion disposed forward of the wheel arch to a rear portion disposed rearward of the wheel arch.

6. The vehicle exterior panel of claim 4, wherein the utility panel in the first position further conceals an access port that allows access to a storage compartment.

7. The vehicle exterior panel of claim 6, wherein the storage cavity is located above the wheel arch and wherein the access port is located forward of the storage cavity.

8. The vehicle exterior panel of claim 7, wherein the utility panel in the first position further conceals an additional storage cavity located rearward of the storage cavity.

9. The vehicle exterior panel of claim 6, wherein the storage compartment is a cargo bed.

10. A vehicle, comprising:
a vehicle exterior panel having a rigid body defining at least in part a vehicle outer surface;
a utility panel having an exterior surface and a utility surface, wherein the utility panel comprises:
a lower portion pivotably mounted above a wheel arch such that the utility panel is movable with respect to the rigid body between a first position and a second position; and
an upper portion that extends longitudinally beyond the lower portion;
a storage cavity;
wherein the storage cavity is concealed by the utility panel when the utility panel is in the first position;
wherein the exterior surface of the utility panel is integrated into the vehicle outer surface when the utility panel is in the first position; and
wherein the utility surface is deployed outwardly from the vehicle outer surface and positioned substantially horizontally when the utility panel is moved to the second position.

11. The vehicle of claim 10, wherein the vehicle exterior panel is a rear quarter panel of the vehicle.

12. The vehicle of claim 11, further comprising:
an access port that allows access to a cargo bed, wherein the access port is concealed by the utility panel when the utility panel is in the first position; and
a tailgate configured to be lowered to an open position facilitating access to the cargo bed of the vehicle, wherein the utility surface is vertically above a deployed surface of the tailgate when the utility panel is in the second position and the tailgate is opened.

13. The vehicle of claim 10, wherein:
the utility panel is a first utility panel
the vehicle comprises at least a second utility panel, the second utility panel movable with respect to the rigid body between first and second positions, the second utility panel defining a second utility surface that is deployed outwardly from the vehicle outer surface and substantially horizontally when the second utility panel is moved to the second position; and
the second utility panel in the second position is at a vertical position below the first utility panel in the second position.

14. The vehicle exterior panel of claim 2, wherein the rear quarter panel defines the wheel arch, the utility panel extending above the wheel arch when the utility panel is in the first position.

15. The vehicle of claim 10, wherein:
the upper and lower portions of the utility panel form a T-shape; and
the T-shape extends outwardly from the vehicle outer surface when the utility panel is in the second position.

16. The vehicle of claim 15, wherein the upper portion of the utility panel extends longitudinally from a front portion disposed forward of the wheel arch to a rear portion disposed rearward of the wheel arch.

17. The vehicle of claim 15, further comprising an access port that allows access to a storage compartment, wherein the access port is concealed by the utility panel when the utility panel is in the first position.

18. The vehicle of claim 17, wherein the storage cavity is located above the wheel arch and wherein the access port is located forward of the storage cavity.

19. The vehicle of claim 17, further comprising an additional storage cavity, wherein:
the additional storage cavity is concealed by the utility panel when the utility panel is in the first position;
the additional storage cavity is located rearward of the storage cavity;
the storage cavity is located above the wheel arch; and
the access port is located forward of the storage cavity.

20. The vehicle of claim 17, wherein the storage compartment is a cargo bed that is also accessible via a tailgate.

* * * * *